United States Patent
Lee et al.

(10) Patent No.: US 11,569,990 B2
(45) Date of Patent: Jan. 31, 2023

(54) DISTRIBUTED DATA MANAGEMENT METHOD BASED ON A BLOCKCHAIN NETWORK AND APPARATUS THEREFOR

(71) Applicant: SAMSUNG SDS CO., LTD., Seoul (KR)

(72) Inventors: Jung Eun Lee, Seoul (KR); Jun Tae Kim, Seoul (KR); Ji Won Kim, Seoul (KR); Sang Won Lee, Seoul (KR); Kyu Sang Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 123 days.

(21) Appl. No.: 17/080,131

(22) Filed: Oct. 26, 2020

(65) Prior Publication Data

US 2022/0038273 A1   Feb. 3, 2022

(30) Foreign Application Priority Data

Jul. 28, 2020   (KR) .......................... 10-2020-0093717

(51) Int. Cl.
*H04L 9/08* (2006.01)
*H04L 9/32* (2006.01)
(Continued)

(52) U.S. Cl.
CPC .......... *H04L 9/0866* (2013.01); *H04L 9/0825* (2013.01); *H04L 9/3231* (2013.01);
(Continued)

(58) Field of Classification Search
None
See application file for complete search history.

(56) References Cited

U.S. PATENT DOCUMENTS

| 10,310,765 B1* | 6/2019 | Laurence | ................. G06F 3/067 |
| 2018/0139042 A1* | 5/2018 | Binning | .............. H04L 63/0428 |

(Continued)

FOREIGN PATENT DOCUMENTS

| CN | 109491968 A | 3/2019 | |
| EP | 1387523 A1 * | 2/2004 | ........... H04L 9/0822 |
| KR | 10-2020-0083178 A | 7/2020 | |

OTHER PUBLICATIONS

European Search Report For EP20206586.8 dated Apr. 14, 2021 from European patent office in a counterpart European patent application.

*Primary Examiner* — William J. Goodchild
*Assistant Examiner* — Mayasa A. Shaawat
(74) *Attorney, Agent, or Firm* — The PL Law Group, PLLC

(57) ABSTRACT

A blockchain-based data distribution management method according to an embodiment is performed by a computing device. The method includes generating a plurality of shards by fragmenting a first information, requesting a first block event for distributed storage of the plurality of shards in a plurality of off-chain storages to a blockchain network, and transmitting the plurality of shards to the plurality of off-chain storages, wherein a second information indicating a history of the plurality of shards distributed and stored in the plurality of off-chain storages is recorded in the blockchain network through the first block event, wherein when a predetermined number or more of shards among the plurality of shards are collected, the first information is restored from the collected predetermined number or more of shards.

15 Claims, 22 Drawing Sheets

(51) Int. Cl.
*H04L 67/1097* (2022.01)
*H04L 9/00* (2022.01)

(52) U.S. Cl.
CPC ........ *H04L 9/3247* (2013.01); *H04L 67/1097* (2013.01); *H04L 9/50* (2022.05)

(56) References Cited

U.S. PATENT DOCUMENTS

2018/0357400 A1* 12/2018 Astrakhantsev ........ G06F 21/30
2019/0197532 A1*  6/2019 Jayachandran ....... H04L 9/0897

* cited by examiner

DISTRIBUTED DATA MANAGEMENT METHOD BASED ON A BLOCKCHAIN NETWORK AND APPARATUS THEREFOR

CROSS-REFERENCE TO RELATED APPLICATIONS

This patent application claims the benefit of Korean Patent Application No. 10-2020-0093717 filed on Jul. 28, 2020, which is hereby incorporated by reference in its entirety into this application.

BACKGROUND

1. Field

The disclosure relates to a blockchain-based data distribution management method and apparatus therefor. In more detail, it relates to a blockchain-based data distribution management method and apparatus for preparing against the risk of hacking and safely storing data by distributing and storing secret information after encrypting it.

2. Description of the Related Art

A blockchain system is a system that processes data storage and management in a decentralized way, and is in the spotlight as a next generation data processing method in that it strengthens personal data sovereignty and is free from single point of failure problem.

In the blockchain system, an asymmetric key cryptosystem is mainly used as a method to verify an individual's data access rights. With regard to this, referring to FIG. 1, the asymmetric key cryptosystem 2 includes a pair of public key 3 and private key 4 that match each other, and among them, the public key 3 is recorded and published on a block chain network 1, and the private key 4 is stored privately by the user 5. Thereafter, when the user 5 accesses the information recorded in the blockchain network 1, the user 5 decrypts the public key 3 recorded and published on the blockchain network 1 with the private key 4 stored by himself to prove that the user 5 has the access right to the information.

However, in this asymmetric key cryptosystem 2, there is a burden that the user 5 must manage his/her own private key 4 without losing or leaking it to the outside. If the private key 4 is lost, a problem that the user 5 is no longer prove his/her right to the blockchain network 1 occurs, and if the private key 4 is leaked to the outside, the third party who obtains it can steal the access right of the user 5 without permission.

Therefore, there is a need for an improved data management method that can manage the secret information of the user 5 such as the private key 4 without leaking it to the outside as well as losing it.

SUMMARY

A technical problem to be solved through some embodiments of the disclosure is to provide a blockchain-based data distribution management method and apparatus for preventing leakage of secret information and recovering it when necessary.

Another technical problem to be solved through some embodiments of the disclosure is to provide a blockchain-based data distribution management method and apparatus for transparently managing data by recording data management history on on-chain while enhancing the security of secret information through data encryption and distributed storage.

Another technical problem to be solved through some embodiments of the disclosure is a blockchain-based data distribution management method and apparatus for preventing the risk of hacking from unauthorized devices by verifying the identity of a device requesting or providing data through a blockchain network.

The technical problems of the disclosure are not limited to the technical problems mentioned above, and other technical problems that are not mentioned will be clearly understood by those skilled in the art from the following description.

According to an embodiment of the disclosure, a blockchain-based data distribution management method is performed by a computing device, and includes generating a plurality of shards by fragmenting a first information, requesting a first block event for distributed storage of the plurality of shards in a plurality of off-chain storages to a blockchain network, and transmitting the plurality of shards to the plurality of off-chain storages, wherein a second information indicating a history of the plurality of shards distributed and stored in the plurality of off-chain storages is recorded in the blockchain network through the first block event, wherein when a predetermined number or more of shards among the plurality of shards are collected, the first information is restored from the collected predetermined number or more of shards.

According to an embodiment of the disclosure, a blockchain-based data distribution management apparatus includes a processor, a memory for loading a computer program executed by the processor, and a storage for storing the computer program, wherein the computer program includes instructions for executing operations including generating a plurality of shards by fragmenting a first information, requesting a first block event for distributed storage of the plurality of shards in a plurality of off-chain storages to a blockchain network, and transmitting the plurality of shards to the plurality of off-chain storages, wherein a second information indicating a history of the plurality of shards distributed and stored in the plurality of off-chain storages is recorded in the blockchain network through the first block event, wherein when a predetermined number or more of shards among the plurality of shards are collected, the first information is restored from the collected predetermined number or more of shards.

According to an embodiment of the disclosure, a computer program is combined with a computing device for executing a blockchain-based data distribution management method, wherein the computer program is stored in a computer readable recording medium for executing steps including generating a plurality of shards by fragmenting a first information, requesting a first block event for distributed storage of the plurality of shards in a plurality of off-chain storages to a blockchain network, and transmitting the plurality of shards to the plurality of off-chain storages, wherein a second information indicating a history of the plurality of shards distributed and stored in the plurality of off-chain storages is recorded in the blockchain network through the first block event, wherein when a predetermined number or more of shards among the plurality of shards are collected, the first information is restored from the collected predetermined number or more of shards.

DETAILED DESCRIPTION

Figure 1:
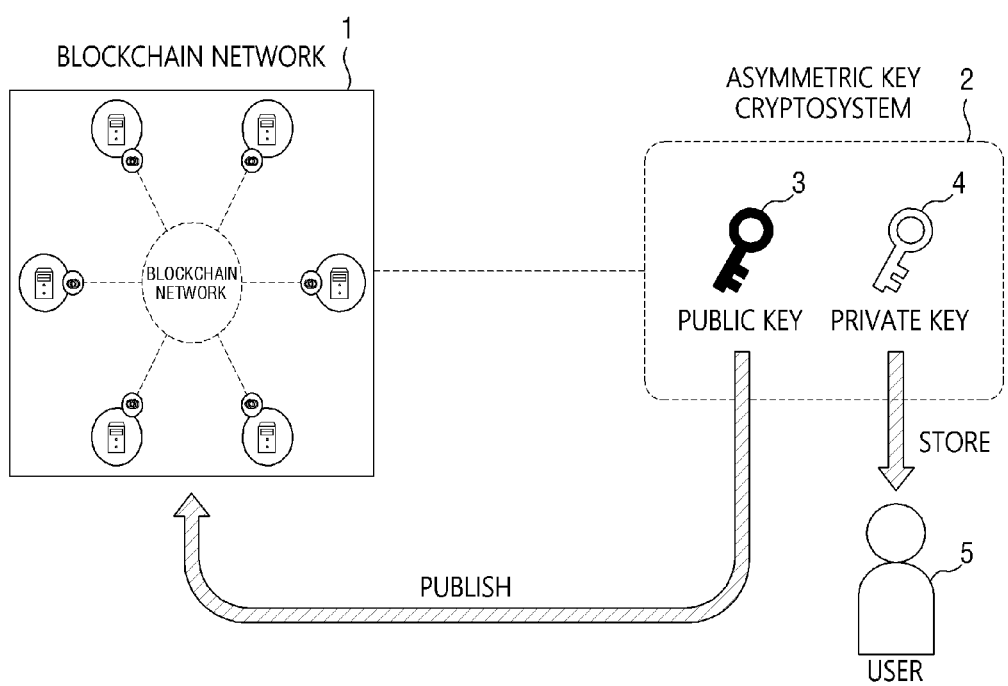
FIG. 1 is a diagram for describing a general data access right verification system in a blockchain system.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the disclosure will be described in detail with reference to the accompanying drawings.

Figure 2:
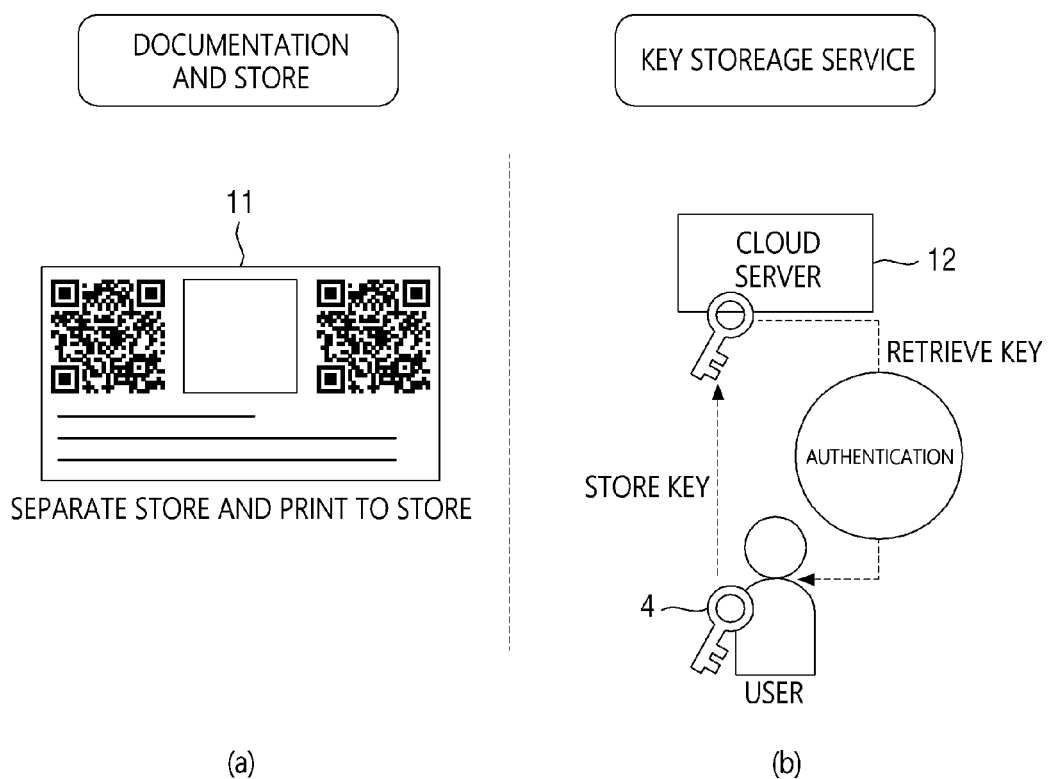
FIG. 2 is a diagram describing conventional general methods of managing personal secret information.

FIG. 2 is a diagram illustrating conventional general methods of managing personal secret information. In FIG. 2, conventional methods for storing secret information of a user such as a private key 4 are described.

(a) of FIG. 2 illustrates a method of documenting and storing user's secret information. For example, it is a method of converting public and private keys used in asymmetric key cryptosystems into QR codes and storing them in separate storage medium, or printing them on paper and storing them in a safe place. However, this method has a problem that there is still a risk of losing a medium or paper, on which secret information is recorded.

(b) of FIG. 2 describes a method of storing user's secret information in a centralized key storage service. In this method, the user uploads his/her secret information 4 to the cloud server 12 provided by the key storage service, and when the secret information 4 is needed again in the future, secret information 4 is retrieved from the cloud server 12 after authenticating the identity using his/her personal information. However, the method of using the key storage service has a problem that there is a risk of single point of failure, in which a large amount of secret information 4 is leaked when the cloud server 12 is hacked because the secret information 4 of several individuals is concentrated on the centralized cloud server 12.

Figure 3:
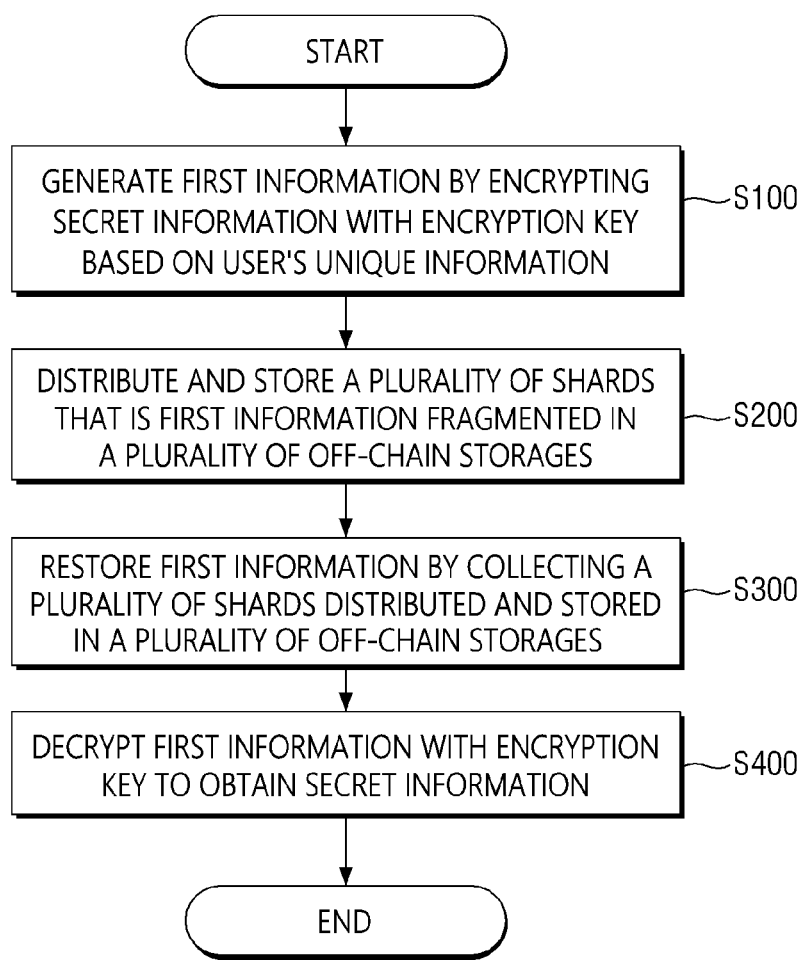
FIG. 3 is a flowchart describing a data distribution management method based on a blockchain according to the disclosure.

FIG. 3 is a flowchart illustrating a blockchain-based data distribution management method according to the disclosure. FIG. 3 describes a data distribution management method that eliminates the risk of a single point of failure without the risk of losing secret information. The method of FIG. 3 is performed, for example, by a data distribution management device that can be implemented with the computing device 500 of FIG. 22. Therefore, if the performing subject is not specified in the steps below, it is assumed that the performing subject is the data distribution management device. Hereinafter, it will be described with reference to FIGS. 3 and 4 together.

In step S100, the data distribution management device generates first information 30 by encrypting the secret information 4 with an encryption key 20 based on the user's unique information 10. Here, the user's unique information 10 is information uniquely derived from the user or owned by the user 5, and may mean information generated based on the inherent feature of the user 5 such as biometric information extracted from the body of the user 5 or information generated using information exclusively owned by the user 5 (e.g., information generated using a smart key provided only to the user). As a specific example, the user's unique information 10 may be information obtained by extracting feature points from biometric information such as fingerprint information, iris information, facial recognition information, or gene information of the user 5.

The data distribution management device acquires biometric information from the user 5, for example, through a sensor and processes the feature points to obtain the unique information 10. Then, the encryption key 20 is generated through an encryption key generation algorithm using the obtained unique information 10. As an embodiment, the encryption key 20 may be a symmetric key.

In this way, if the encryption key 20 is generated based on the user's unique information 10, there is an advantage that the encryption key 20 is identically regenerated using the user's unique information 10 even if the encryption key 20 is lost in the future.

Then, the data distribution management device generates the first information 30 by encrypting the user's secret information 4 (for example, a private key) with the generated encryption key 20. This is to further increase security by encrypting secret information before distributed storage in off-chain storages.

In step S200, the data distribution management device generates a plurality of shards 40 by fragmenting the encrypted first information 30, and distributes and stores the generated plurality of shards 40 in a plurality of off-chain storages 50. In this case, the data distribution management device may record the history (second information) of the plurality of shards 40 distributed and stored in the plurality of off-chain storages 50 in the blockchain network 60.

In this way, if the first information 30 is divided into several shards and distributed and stored, there is an advantage that even if some of the plurality of off-chain storages 50 are hacked, the user's first information 30 and secret information 4 can be securely protected from external hacking since the original first information 30 cannot be restored by only the shards of the hacked off-chain storage.

Further, since the second information indicating the history of the plurality of shards 40 distributed and stored in which off-chain storage is recorded in the blockchain network 60, it is easy to know which off-chain storage to retrieve a plurality of shards 40 by referring to the second information when the first information 30 is recovered later. Furthermore, there is also an advantage that the process of distributing and storing the first information 30 can be transparently managed through a blockchain.

Step S300 is a step for recovering the first information 30 distributed and stored in this way. In step S300, the data distribution management device collects a plurality of shards 40 distributed and stored in a plurality of off-chain storages 50. Then, the first information 30 is restored by integrating the collected plurality of shards 40. At this time, the data distribution management device can refer to the recorded distribution storage history (second information) of the blockchain network 60 in order to know the plurality of off-chain storages 50 to collect the plurality of shards 40. Further, the data distribution management device may record the history (third information) of collecting the plurality of shards 40 from the plurality of off-chain storages 50 in the blockchain network 60.

In step S400, the data distribution management device obtains the secret information 4 by decrypting the first information 30 with the encryption key 20. In this case, the encryption key 20 may be one that stores the encryption key 20 generated in the previous information storage step, or may be one newly created using the unique information 10 of the user 5 in the information recovery step.

According to the method described above, by encrypting the user's secret information and then distributing and storing it in a plurality of off-chain storages, it is possible to prepare for an external hacking risk and to safely store the user's secret information.

Further, since the distribution management history of distributing, storing data, and re-collecting it is recorded on on-chain, the process of distributed management of data can be transparently managed, while data can be easily recovered by referring to the distribution management history recorded in on-chain when recovering data later.

Figure 4:
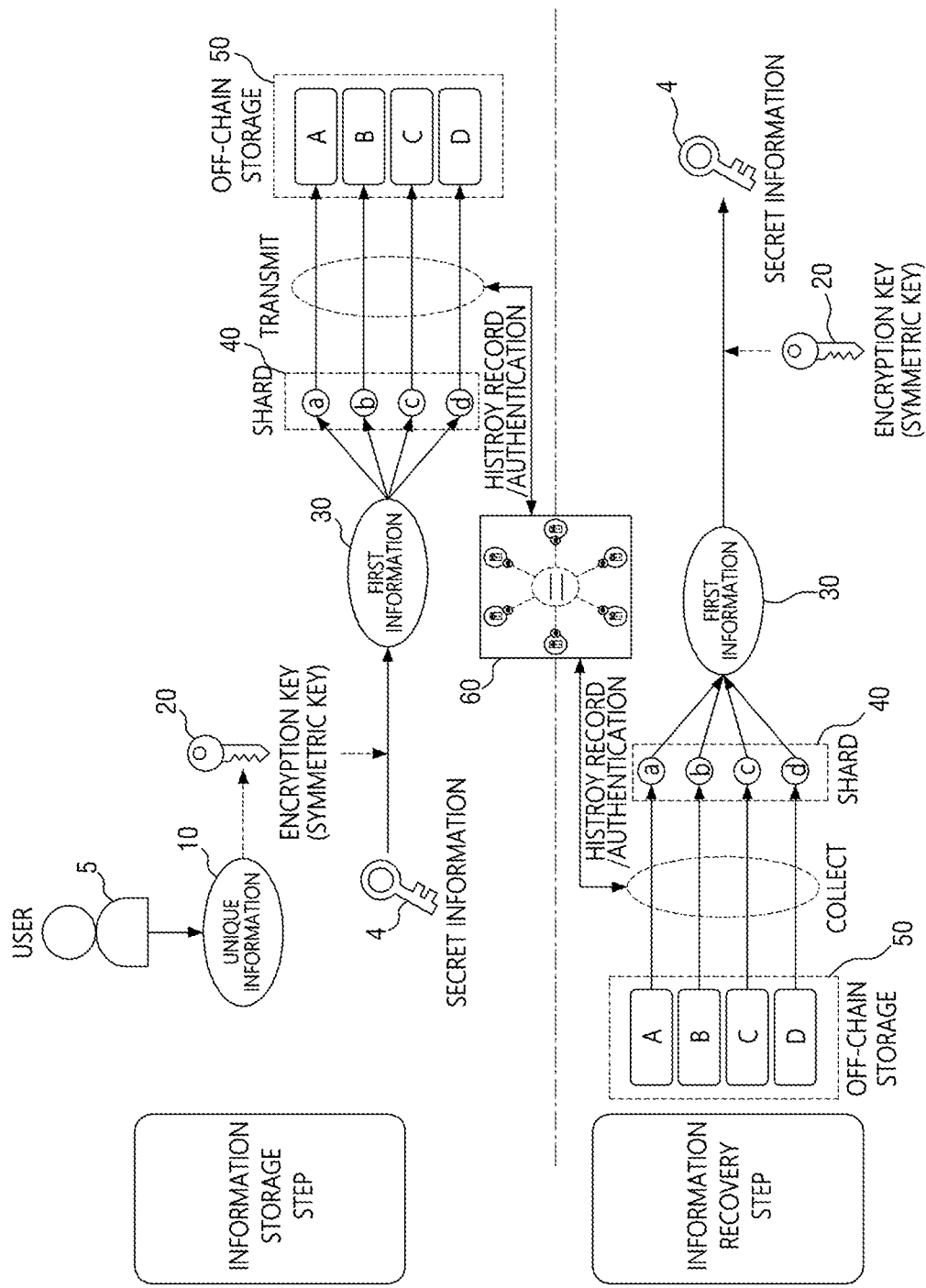
FIG. 4 is a conceptual diagram for further describing the data distribution management method described in FIG. 3.

Hereinafter, more detailed embodiments of the data distribution management method described in FIGS. 3 to 4 will be described.

Figure 5:
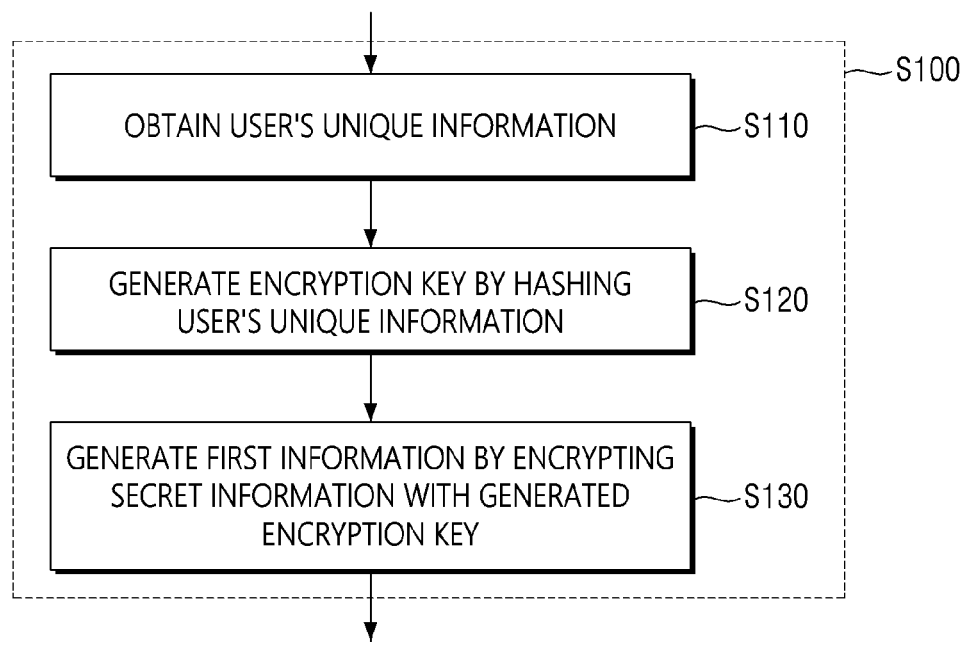
FIG. 5 is a flowchart illustrating an exemplary embodiment, in which step S100 of generating first information in FIG. 3 is embodied.
Figure 6:
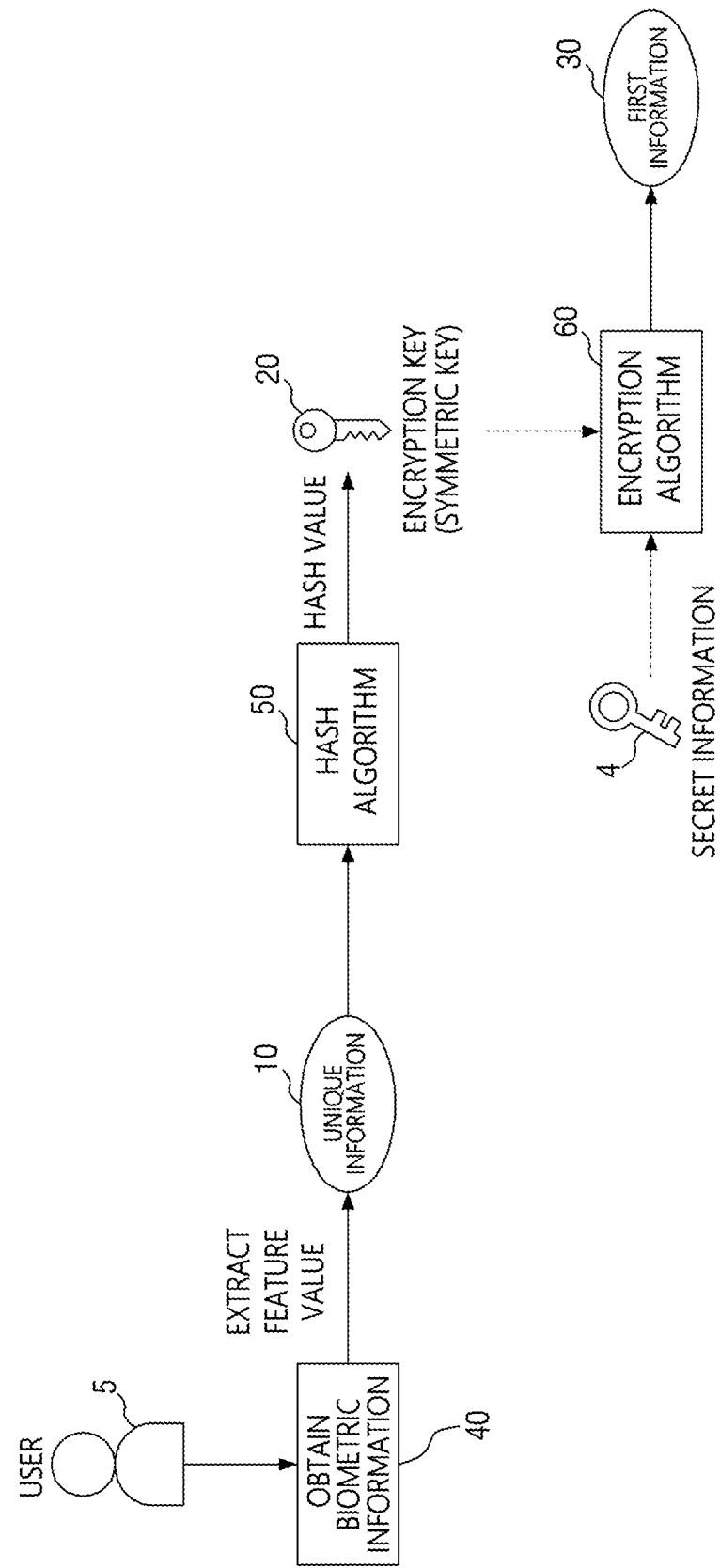
FIG. 6 is a conceptual diagram for further describing the embodiment described in FIG. 5.

FIG. 5 is a flowchart illustrating an exemplary embodiment, in which the step S100 of generating the first information in FIG. 3 is embodied. Referring to FIG. 5, a specific example of encrypting the secret information 4 using the unique information of the user 5 will be described. Hereinafter, it will be described with reference to FIGS. 5 and 6.

In step S110, the data distribution management device obtains the unique information 10 of the user 5. For example, the data distribution device may obtain fingerprint information, iris information, facial recognition information, or genetic information of the user 5 through a sensor 40, and then extract a feature value from it and generate the unique information 10 based on this.

In step S120, the data distribution management device generates an encryption key by hashing the user's unique information. Specifically, the data distribution management device may output a hash value by hashing the unique information 10 through the hash algorithm 50, and use the output hash value as the encryption key 20 or use the output hash value to generate the encryption key 20.

In step S130, the data distribution management device generates the first information 30 by encrypting the secret information 4 with the encryption key 20 generated using the encryption algorithm 60.

Figure 7:
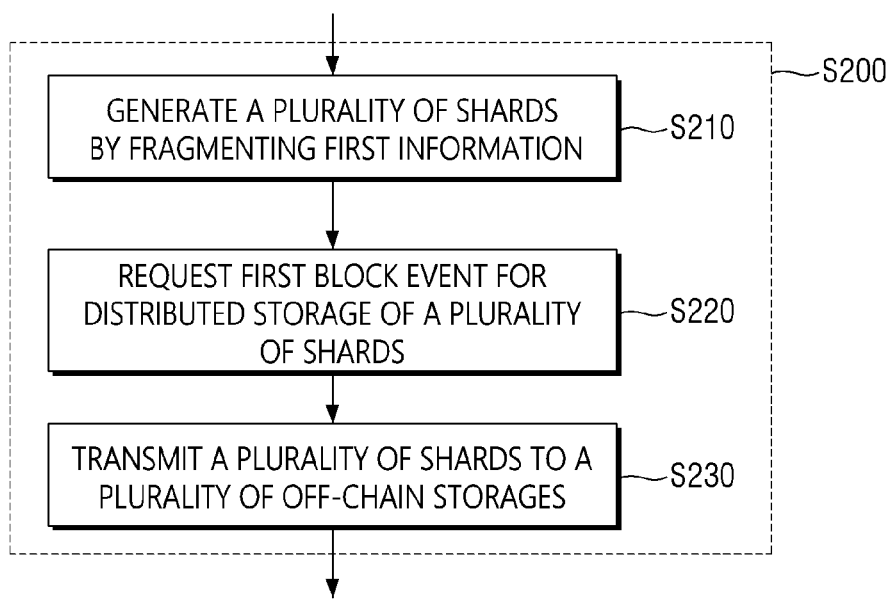
FIG. 7 is a flowchart illustrating an exemplary embodiment, in which step S200 of distributing and storing a plurality of shards in a plurality of off-chain storages in FIG. 3 is embodied.
Figure 8:
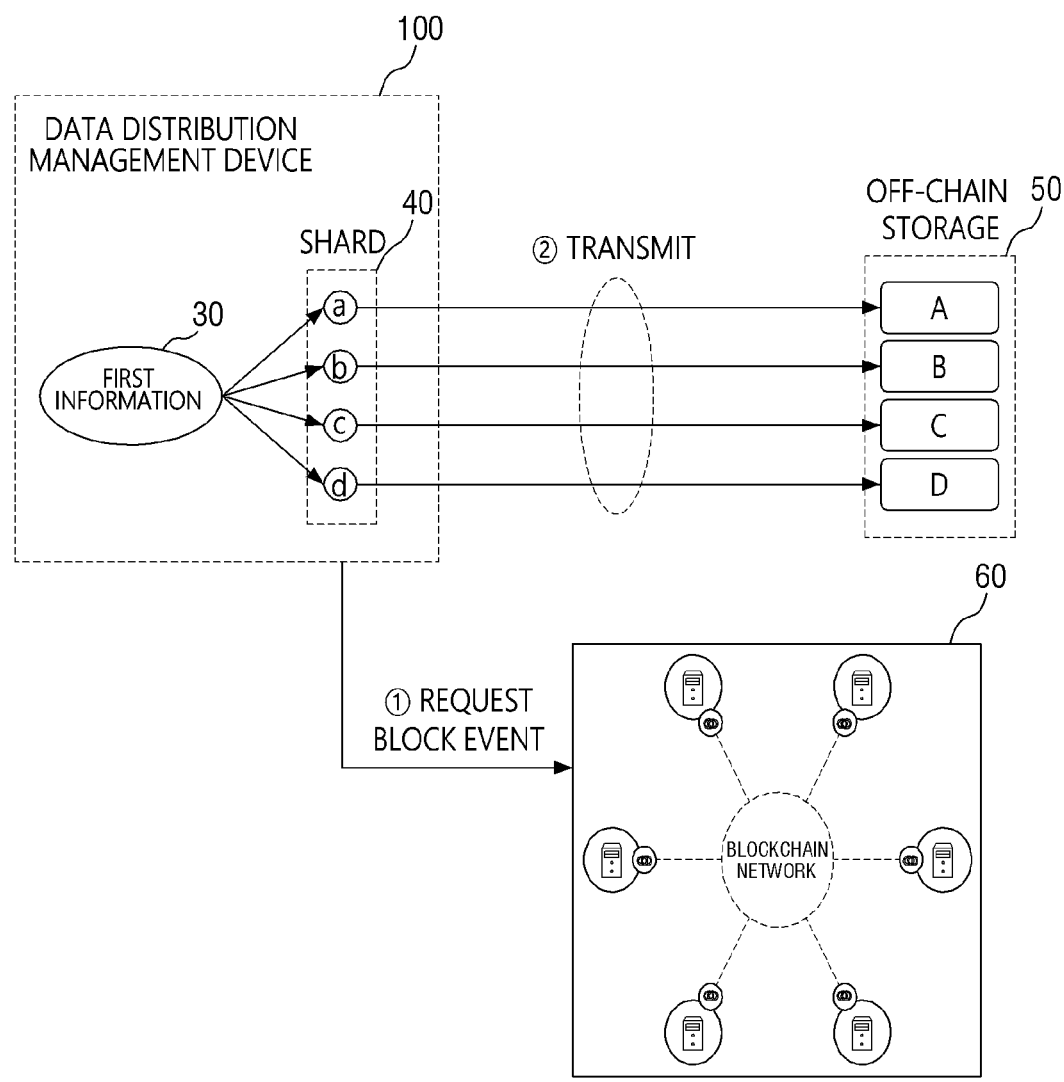
FIG. 8 is a conceptual diagram for further describing the embodiment illustrated in FIG. 7.

FIG. 7 is a flowchart illustrating an exemplary embodiment, in which step S200 of distributing and storing a plurality of shards in a plurality of off-chain storages in FIG. 3 is embodied. In FIG. 7, a specific example of distributing and storing the first information 30 in a plurality of off-chain storages 50 is described. Hereinafter, it will be described with reference to FIGS. 7 and 8.

In step S210, the data distribution management device 100 generates a plurality of shards 40 by fragmenting the first information 30. Specifically, in order to distribute and store the first information 30 in several places, the data distribution management device 100 fragments the first information 30 through a data fragmentation algorithm and divides it into multiple shards.

At this time, the data distribution management device 100 may configure a data fragmentation algorithm such that if there are only a predetermined number or more of shards among the plurality of shards generated by fragmenting the first information 30, the original first information 30 can be recovered. For example, when it is assumed that a total of n shards are generated by fragmenting the first information 30, a data fragmentation algorithm can be configured so that the original first information 30 can be completely recovered even with only k random shards among n shards.

As an embodiment, the data fragmentation algorithm may be Shamir Secret Sharing algorithm.

In step S220, the data distribution management device 100 requests a first block event for distributed storage of the plurality of shards 40 to the blockchain network 60. The first block event is a block event for recording second information indicating a history of the plurality of shards 40 distributed and stored in which off-chain storage 50, respectively, in the blockchain network 60.

In step S230, the data distribution management device 100 distributes and transmits the plurality of shards 40 generated previously to the plurality of off-chain storages 50. At this time, the data distribution management device 100 distributes and transmits each shard (a, b, c, d) to the off-chain storage (A, B, C, D), which matches it, to correspond to the distribution storage history recorded through the first block event.

Meanwhile, although it is illustrated that step S230 is performed after step S220, the scope of the disclosure is not limited thereto. For example, as shown in FIG. 7, although on-chain data is first recorded through a block event, and after confirming that on-chain data is successfully recorded, each shard may be transmitted to the off-chain storage (first block event occurs→shard transmission), on the contrary, it is also possible to transmit each shard to an off-chain storage first and then record the transmission history as on-chain data (shard transmission→first block event occurs).

Figure 9:
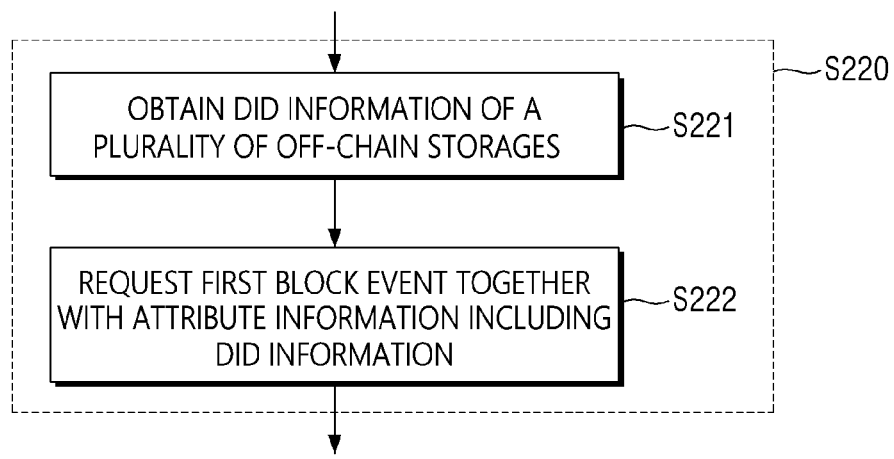
FIG. 9 is a flowchart illustrating an exemplary embodiment, in which step S220 of requesting a first block event in FIG. 7 is embodied.

FIG. 9 is a flowchart illustrating an exemplary embodiment, in which step S220 of requesting a first block event in FIG. 7 is embodied. In FIG. 9, a specific example of history information recorded through a first block event is presented. Hereinafter, it will be described with reference to FIG. 9.

In step S221, the data distribution management device 100 obtains DID information of a plurality of off-chain storages 50. Here, the DID (Decentralized Identifier, distributed identity authentication) information is information including DIDs of each of the plurality of off-chain storages 50 and is information for uniquely identifying each of the plurality of off-chain storages 50.

The data distribution management device 100 may request and obtain the DID information from a plurality of off-chain storages 50 when distributing and storing the first information 30, or obtain the DID information in advance and store it in a storage medium, and then, when the first information 30 is distributed and stored, it may be retrieved from the storage medium and obtained.

In step S222, the data distribution management device 100 requests a first block event together with attribute information including DID information of the plurality of off-chain storages 50 to the blockchain network 60. The blockchain network 60 records the attribute information on the blockchain network 60 through a first block event.

Figure 10:
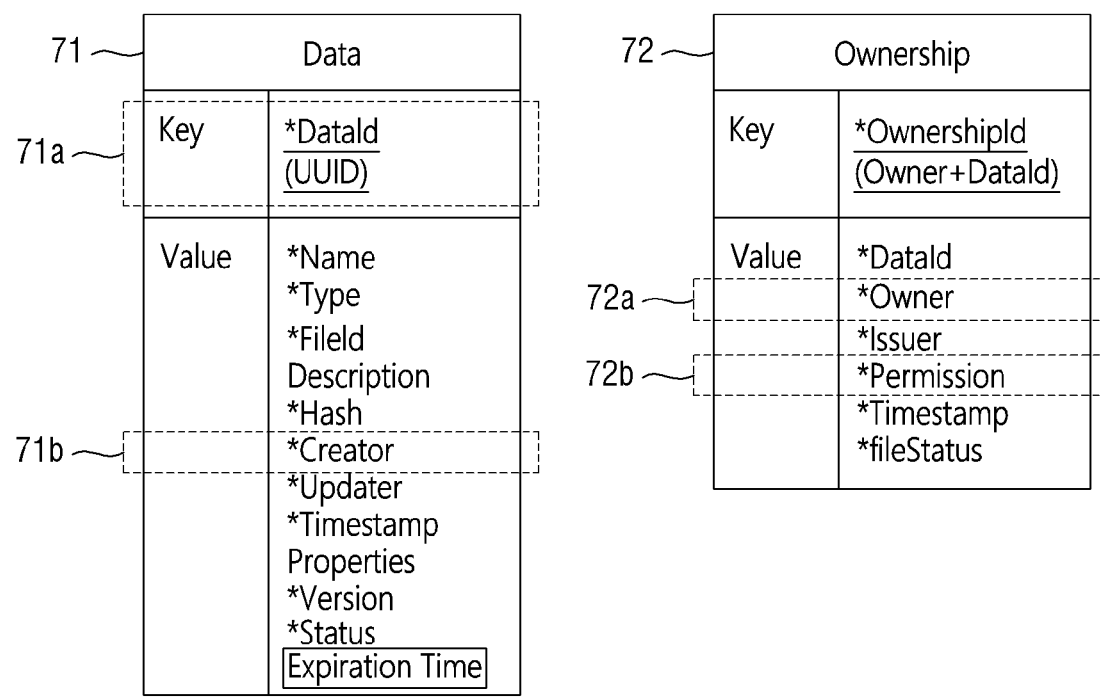
FIG. 10 is a diagram illustrating an exemplary data structure of attribute information mentioned in FIG. 9.

FIG. 10 is a diagram illustrating an exemplary data structure of attribute information mentioned in FIG. 9. Referring to FIG. 10, the attribute information 70 includes shard information area 71 and off-chain storage information area 72. In FIG. 10, each of the shard information area 71 and the off-chain storage information area 72 is illustrated as representing information of one shard and one off-chain storage.

The shard information area 71 is area representing attribute information of a shard. The shard information area 71 may include a shard data ID item 71*a* and a shard creator item 71*b*. The shard data ID item 71*a* is an item, in which an ID uniquely identifying each shard is described. The shard creator item 71*b* is an item indicating a user (for example, the user of FIG. 4) or a device (for example, a data distribution management device) who created the shard.

The off-chain storage information area 72 is area representing attribute information of an off-chain storage, in which a shard is to be stored. The off-chain storage information area 72 may include an owner item 72*a* and an authority item 72*b*. The owner item 72*a* is an item, in which an ID uniquely identifying an off-chain storage, in which a shard is distributed and stored, is described. The authority item 72*b* is an item representing the authority for a shad that the off-chain storage stores.

As an embodiment, the creator item 71*b* of the shard information area 71 may be composed of a DID of a user or a device. The DID uniquely identifies a user or device, but the DID itself is anonymized, so it is difficult to specifically know who the user or device is from the DID alone. Since the data recorded in the blockchain network 60 is public data that anyone can read, in order to ensure the anonymity of the user 5 or the data management device, the creator item 71*b* records the DID instead of the real name of the user or device.

Similarly, as an embodiment, the owner item 72*a* of the off-chain storage information area 72 may be configured with the DID of the off-chain storage. For similar reasons as in the creator item 71*b*, the owner item 72*b* records the DID instead of the real name of the off-chain storage in order to ensure the anonymity of the off-chain storage.

Figure 11:
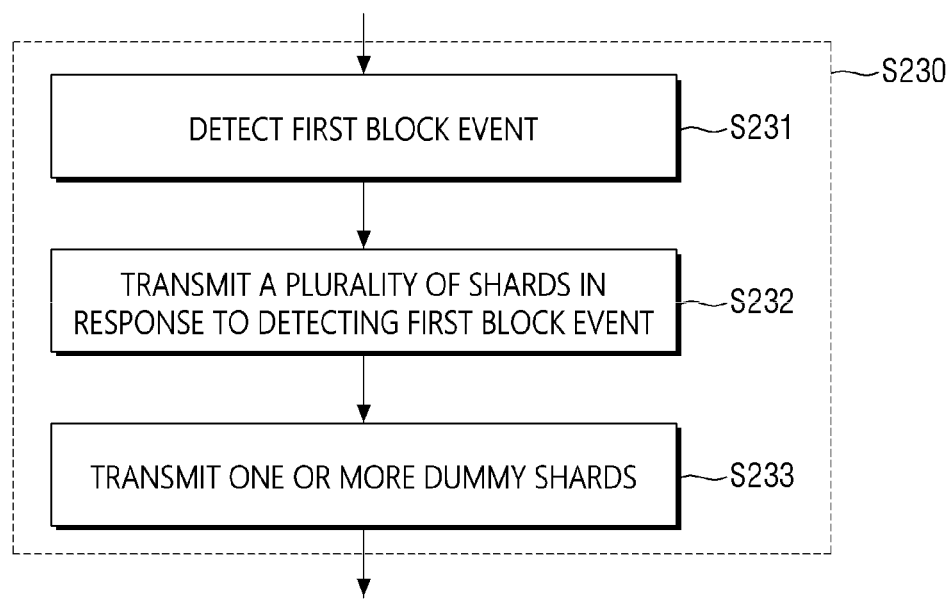
FIG. 11 is an exemplary embodiment, in which step S230 of transmitting a plurality of shards to a plurality of off-chain storage in FIG. 7 is embodied, and a flowchart illustrating an embodiment of transmitting a shard in an outbound method.
Figure 12:
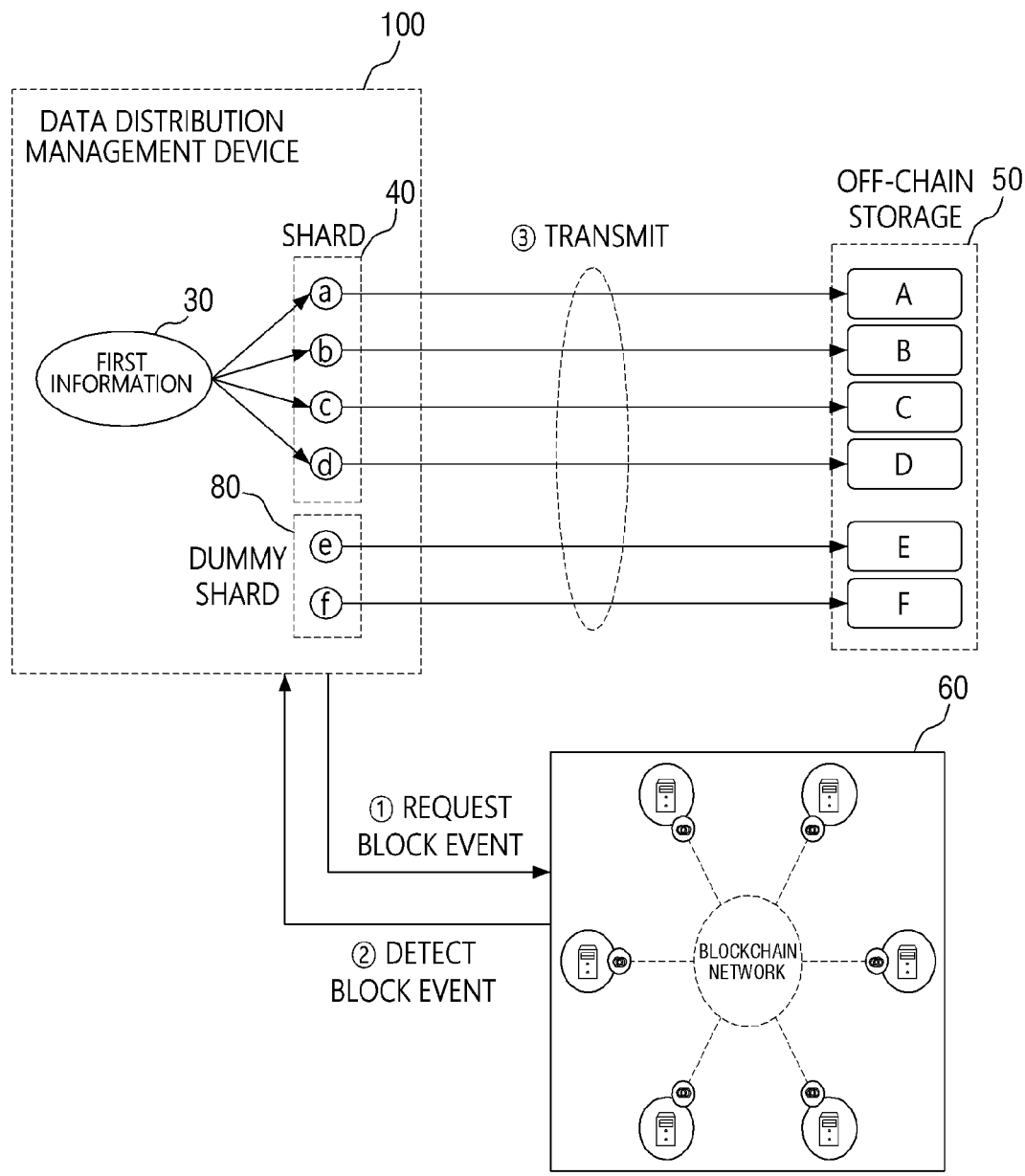
FIG. 12 is a conceptual diagram for further describing the embodiment described in FIG. 11.

FIG. 11 is an exemplary embodiment, in which step S230 of transmitting a plurality of shards to a plurality of off-chain storages in FIG. 7 is embodied, and is a flowchart illustrating an embodiment of transmitting a shad in an outbound method. Here, "outbound" means that the data distribution management device 100 transmits a shard by itself, not by transmission request from the off-chain storage 50. Hereinafter, it will be described with reference to FIGS. 11 and 12 together.

When the first block event occurs on the blockchain network 60 by the first block event request in step S220 of FIG. 7, in step S231, the data distribution management device 100 detects that the first block event has occurred.

In step S232, in response to detecting the first block event, the data distribution management device 100 transmits a plurality of shards 40, which are first information 30 fragmented, to a plurality of off-chain storages 50. At this time, each of the plurality of shards 40 distributes and transmits each shard (a, b, c, d) to the off-chain storage (A, B, C, D), which matches it, to correspond to the distribution storage history (second information) recorded through the first block event.

In step S233, the data distribution management device 100 transmits one or more dummy shards 80 (e, f) to one or more other off-chain storages (E, F). The dummy shard 80 is dummy data that does not contain the information necessary to recover the first information 30, and when the dummy shards 80 are mixed together with the plurality of shards 40 and transmitted, security of the distributed and stored data can be further increased. For example, the history (second information), in which the plurality of shards 40 are distributed and stored, itself can be checked by anyone through the on-chain data recorded in the blockchain, however since the history of the dummy shard 80 stored is described together in the distribution storage history, it is difficult for others to distinguish which one is the real shard and which one is the dummy shard, making it more secure from external hacking risks.

Meanwhile, although steps S232 and S233 have been described as being sequentially performed, the scope of the disclosure is not limited thereto. For example, step S232 and step S233 are merged into one step, and the step of transmitting the plurality of shards 40 and dummy shards 80 may be performed as one step.

Figure 13:
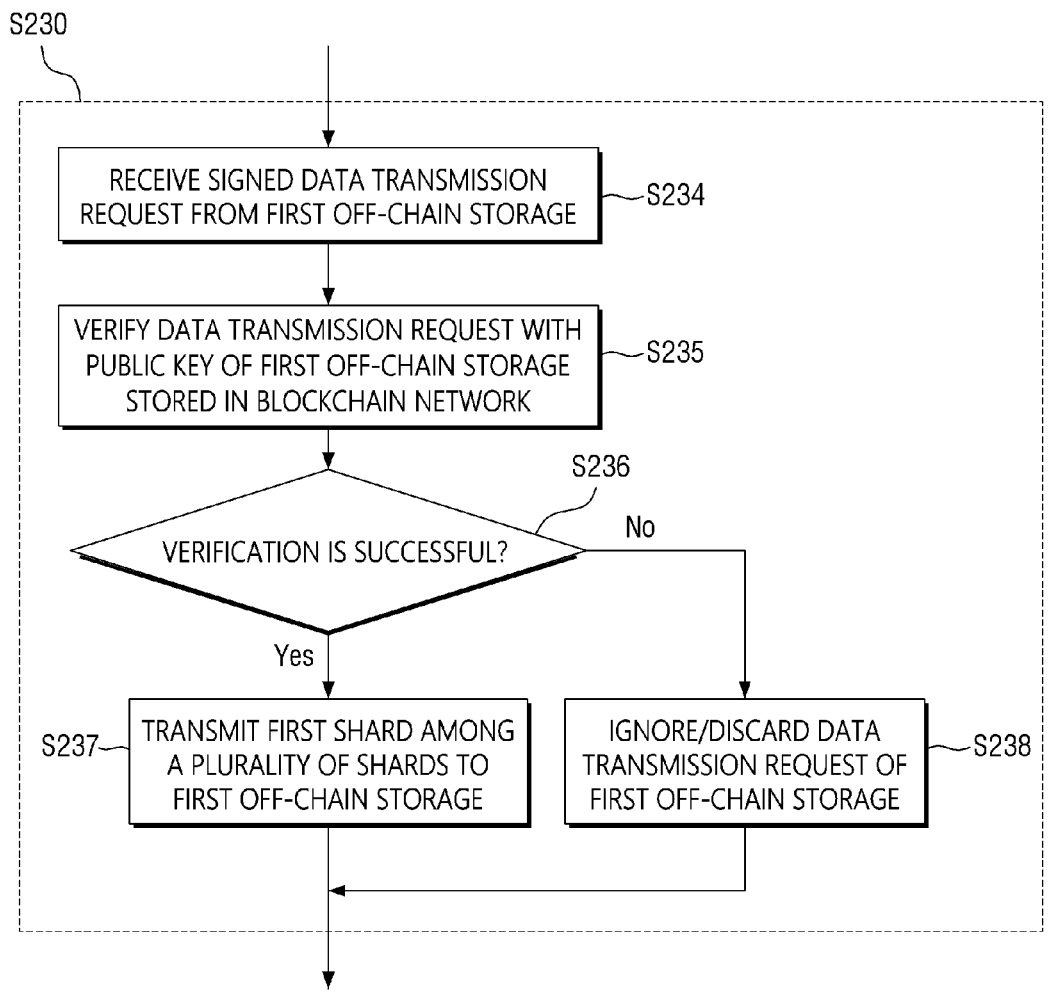
FIG. 13 is another embodiment, in which step S230 of transmitting a plurality of shards to a plurality of off-chain storages in FIG. 7 is embodied, and is a flowchart illustrating an embodiment of transmitting a shard by receiving a shard transmission request in an inbound method.

FIG. 13 is another embodiment, in which step S230 of transmitting a plurality of shards to a plurality of off-chain storages in FIG. 7 is embodied, and is a flowchart illustrating an embodiment of transmitting a shard by receiving a shard transmission request in an inbound method. Here, 'inbound' means receiving a transmission request from the off-chain storage 50 and transmitting a shard in response thereto. Hereinafter, it will be described with reference to FIGS. 13 and 14 together.

In the present embodiment, only a portion of sending one shard 41 (a) to one off-chain storage 51 (A) will be exemplarily described for simplicity of description. However, since the individual processes, in which each shard 40 is transmitted to each of the off-chain storages 50, are the same, it is obvious to those skilled in the art that each of the plurality of shards 40 can be transmitted and stored in a plurality of off-chain storages 50 in parallel or independently by the same method as in this embodiment.

When the first block event occurs on the blockchain network 60 by the first block event request in step S220 of FIG. 7, the first off-chain storage 51 detects that the first block event has occurred through a node 51a connected to itself, or directly detects it by itself. Then, the first off-chain storage 51 confirms that there is a shard 41 to be transmitted to itself by referring to the history (second information) recorded by the first block event. In response, the first off-chain storage 51 signs a data transmission request requesting the data distribution management device 100 to transmit the shard 41 allocated to itself with its own private key and transmits it. At this time, the private key is a private key matched with the DID of the first off-chain storage 51, and a public key paired with the private key is recorded and published in the blockchain network 60.

Now, looking at the flowchart of FIG. 13, in step S234, the data distribution management device 100 receives a signed data transmission request from the first off-chain storage 51. Here, the signed data transmission request means a data transmission request signed by the first off-chain storage 51 with its own private key, as mentioned above.

In step S235, after receiving the signed data transmission request, the data distribution management device 100 verifies the signed data transmission request in order to check whether it is received from an authorized device (i.e., a device determined to distribute and store the shard).

Specifically, when receiving the signed data transmission request, the data distribution management device 100 inquiries the public key of the first off-chain storage 51 in the blockchain network 60. Then, the signed data transmission request is verified in a method of decrypting the signed data transmission request with the inquired public key.

In step S236, the data distribution management device 100 determines whether the verification of the signed data transmission request is successful. For example, the data distribution management device 100 determines that the verification is successful if the signed data transmission request has been successfully decrypted with the public key that was previously inquired, and otherwise determines that the verification fails.

If the verification is successful, it is confirmed that the signed data transmission request is from an authorized device, so the present embodiment proceeds to step S237, and transmits the first shard 41 to the first off-chain storage 51.

On the other hand, if the verification fails, the signed data transmission request does not come from an authorized device, so the present embodiment proceeds to step S238 and does not transmit the first shard 41. Then, the previously received data transmission request is ignored and discarded.

According to this embodiment, in the case of distributing and storing shards in an inbound method, since the identity of the off-chain storage, to which the shard is to be transmitted, can be verified through the blockchain network, hacking risk can be prevented in advance by distinguishing transmission requests from unauthorized devices.

Figure 15:
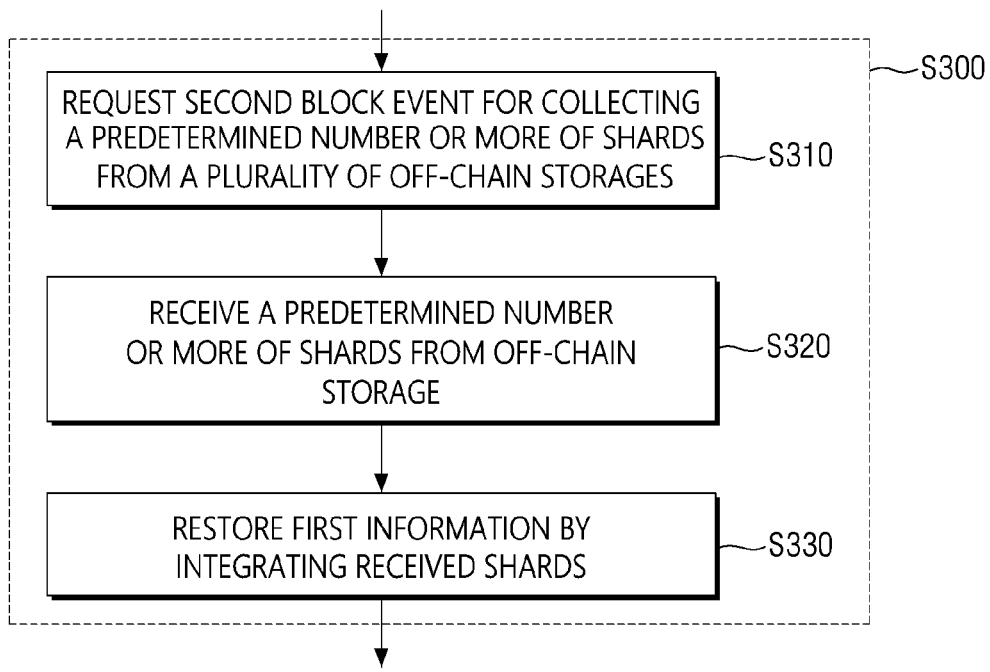
FIG. 15 is a flowchart illustrating an exemplary embodiment, in which step S300 of restoring the first information in FIG. 3 is embodied.

FIG. 15 is a flowchart illustrating an exemplary embodiment, in which step S300 of restoring the first information in FIG. 3 is embodied. In FIG. 15, an embodiment of recovering the original first information 30 by collecting the plurality of shards 40 after they are distributed and stored is described.

In this embodiment, it is assumed that the data distribution management device 100 collects a predetermined number or more of shards among the plurality of shards 40 from a plurality of off-chain storages 50 in order to restore the first information 30.

Figure 16:
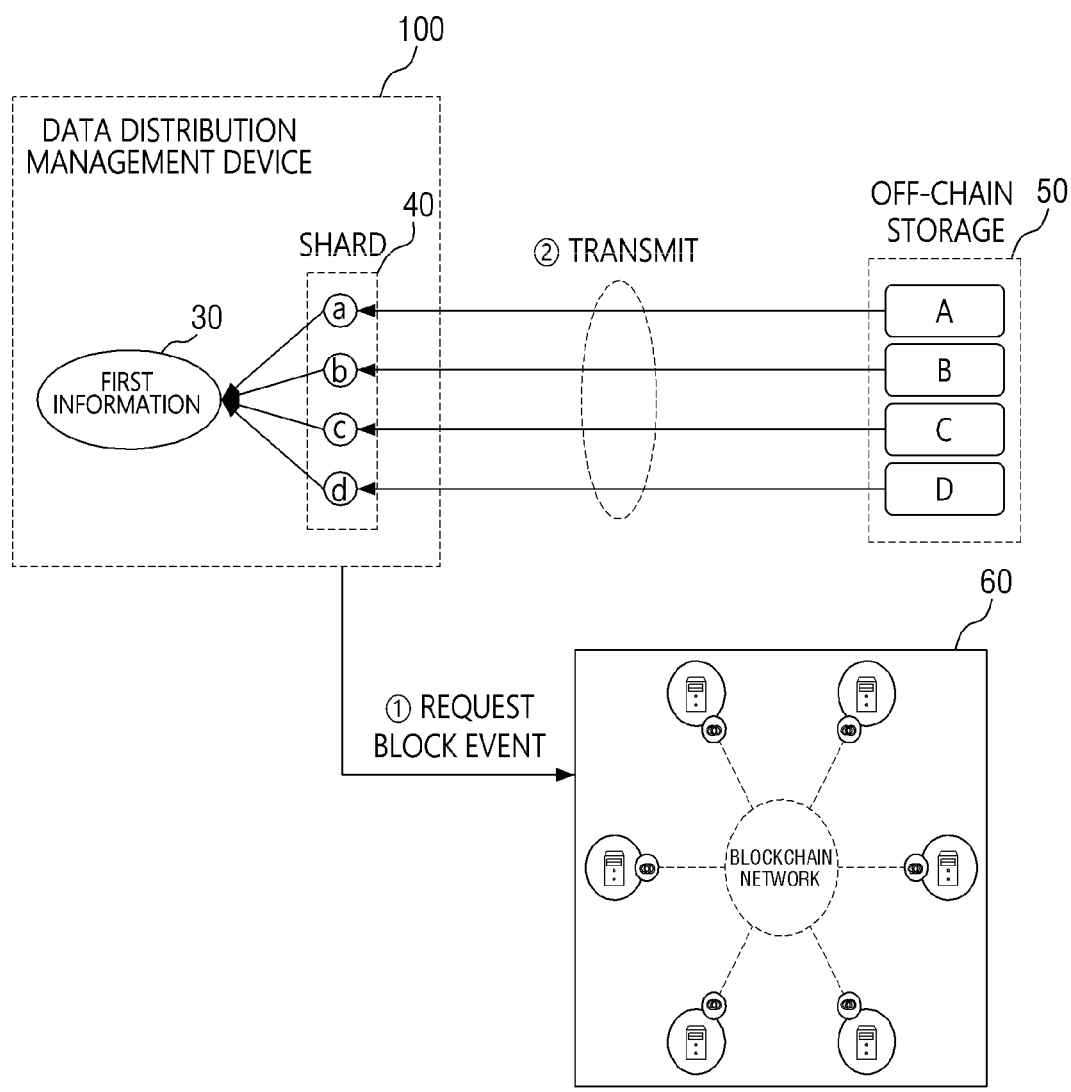
FIG. 16 is a conceptual diagram for further describing the embodiment described in FIG. 15.

In the description of FIG. 7 above, when fragmenting the first information 30, it has been described that a data fragmentation algorithm can be configured such that the original first information 30 can be recovered if there is only a predetermined number or more of shards among the generated plurality of shards. Accordingly, in this embodiment, in order to cover a wider range of application cases, the case of recovering the original first information 30 by collecting a predetermined number or more of shards 40 among a plurality of distributed and stored shards 40 is illustrated and described. Of course, if the predetermined number is set to the same value as the total number of the plurality of shards 40, the present embodiment returns to a method of recovering the first information 30 by collecting all of the plurality of shards 40. Hereinafter, it will be described with reference to FIGS. 15 and 16.

In step S310, the data distribution management device 100 requests a second block event for collecting a predetermined number or more of shards required for recovery of the first information 30 to the blockchain network 60.

The second block event is a block event to record third information indicating the history that which off-chain storage among a plurality of off-chain storages 50 has collected a predetermined number or more of shads among a plurality of shards 40 in the blockchain network 60.

In step S320, the data distribution management device 100 receives the predetermined number or more of the shards distributed and stored in the plurality of off-chain storages 50 from the plurality of off-chain storages 50.

In step S330, the data distribution management device 100 restores the first information 30 by integrating the collected predetermined number or more of shards. At this time, the data integration algorithm used to restore the first information 30 by integrating a predetermined number or more of shards is an algorithm having a complementary relationship to the data fragmentation algorithm used to fragment the first information 30 above.

According to this method, it is possible to recover the original first information 30 by collecting shards distributed and stored in a plurality of off-chain storages 50.

On the other hand, although it is exemplified that step S320 is performed after step S310, the scope of the disclosure is not limited thereto. For example, as shown in FIG. 15, although on-chain data is first recorded through a block event, and after confirming that on-chain data is successfully recorded, each shard may be received from the off-chain storage (second block event occurs→shard reception), on the contrary, it is possible to receive each shard from the off-chain storage first and then record the received history as on-chain data (shard reception→second block event occurs).

Figure 17:
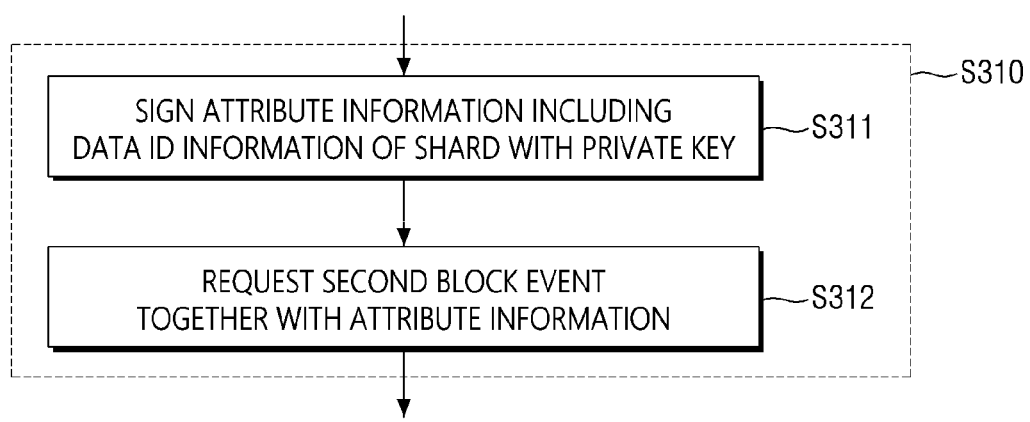
FIG. 17 is a flowchart illustrating an exemplary embodiment, in which step S310 of requesting a second block event in FIG. 15 is embodied.

FIG. 17 is a flowchart illustrating an exemplary embodiment, in which step S310 of requesting a second block event in FIG. 15 is embodied. In the embodiment of FIG. 17, the embodiment that the chain code of the blockchain network 60 verifies the identity of the data distribution management device 100 requesting the second block event, and selectively executes the second block event is described.

In step S311, the data distribution management device 100 signs attribute information including data ID information of a predetermined number or more of shards to be collected with the private key of the data distribution management device 100.

Here, the attribute information may include a data field similar to the shard information area 71 described in FIG. 10 above. For example, the attribute area may include a shard data ID item, in which data ID information of a shard is described, or a creator item, in which a DID of the data distribution management device 100 is described.

The data distribution management device 100 signs the attribute information with its own private key in order to authenticate its identity to the blockchain network 60. In this case, the private key is a private key matched with the DID of the data distribution management device 100, and a public key paired with the private key is recorded and published in the blockchain network 60.

In step S312, the data distribution management device 100 requests a second block event together with the previously signed attribute information to the blockchain network 60.

The chain code of the blockchain network 60 checks the second block event request from the data distribution management device 100, and verifies the second block event request to confirm whether the second block event request is from an authorized device (e.g., a device authorized to collect a shard from the off-chain storage).

Specifically, the chain code may verify the second block event request by a method of inquiring the public key of the data distribution management device 100 in the blockchain network 60 and decrypting the signed attribute information with the inquired public key. When the attribute information is successfully decrypted using the public key, it is assumed that the identity of the data distribution management device 100 is authenticated, and the chain code executes the requested second block event. On the other hand, if the decryption of the attribute information using the public key fails, it is assumed that the identity of the data distribution management device 100 is not authenticated, and the chain code does not execute the second block event.

Here, the chain code is an application program or software code that processes transactions of the blockchain network 60, and is sometimes used interchangeably with the term smart contract depending on the type of the blockchain network 60.

According to this embodiment, it is possible to increase safety from hacking by preventing an unauthorized device from attempting to collect distributed and stored shards.

Figure 18:
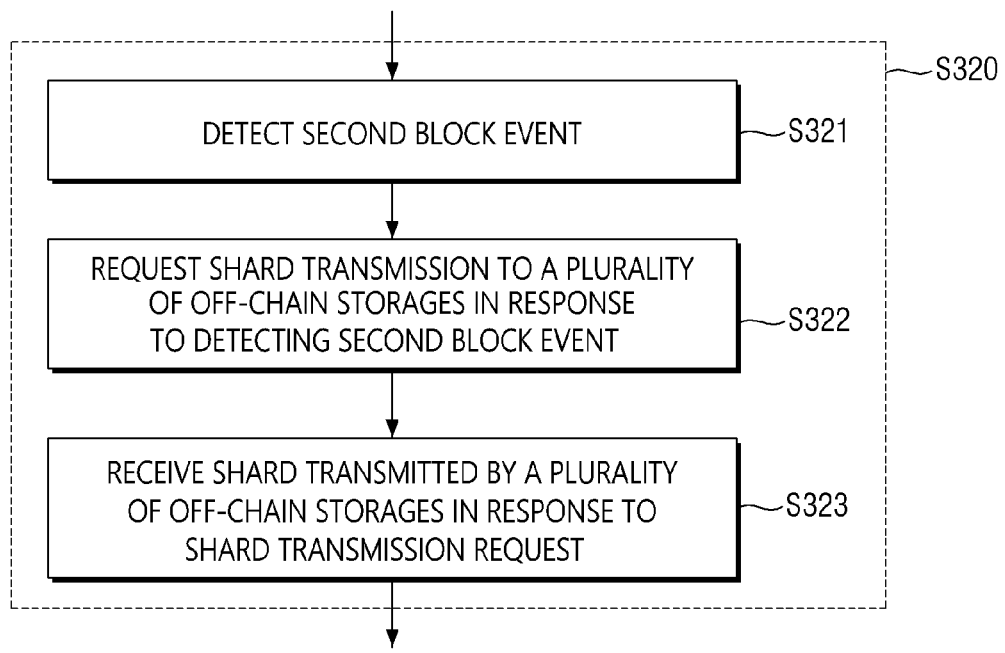
FIG. 18 is an exemplary embodiment, in which step S320 of receiving a predetermined number or more of shards from an off-chain storage in FIG. 15 is embodied, and is a flowchart illustrating an embodiment of receiving a shard by requesting shard transmission in an outbound method.
Figure 19:
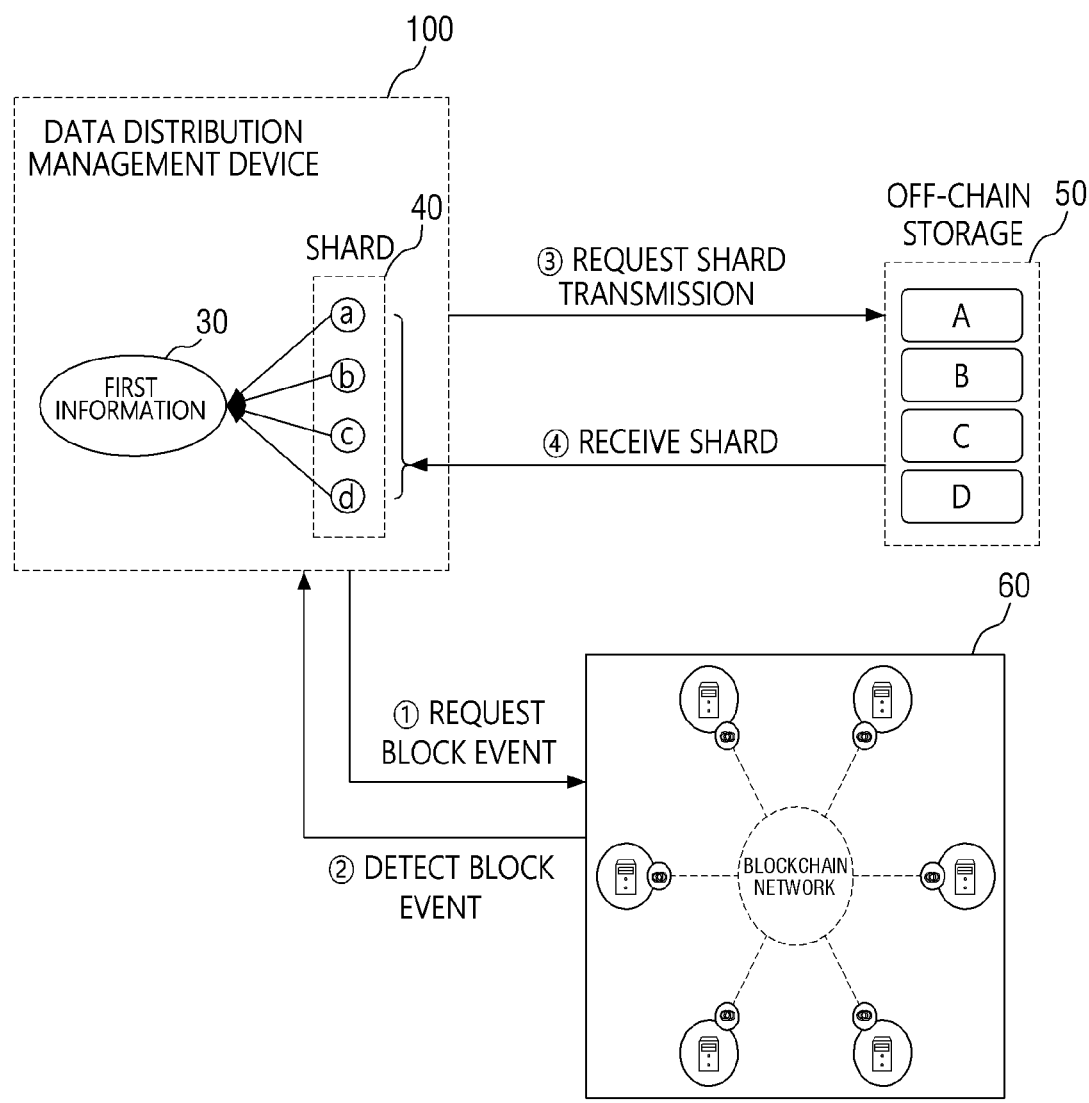
FIG. 19 is a conceptual diagram for further describing the embodiment described in FIG. 18.

FIG. 18 is an embodiment, in which step S320 of receiving a predetermined number or more of shards from an off-chain storage in FIG. 15 is embodied, and is a flowchart illustrating an embodiment of receiving a shard by requesting shard transmission in an outbound method. Here, 'outbound' means that the off-chain storage 50 first sends a shard transmission request, and the off-chain storage 50 receives the transmitted shard in response thereto.

When the second block event occurs on the blockchain network 60, the data distribution management device 100 detects that the second block event has occurred in step S321.

In step S322, the data distribution management device 100 requests shard transmission toward the plurality of off-chain storages 50 in response to detecting the second block event. In this case, the data distribution management device 100 may selectively request shard transmission to only some of the plurality of off-chain storages 50 according to the number of shards required for recovery of the first information 30. For example, if the first information 30 can be recovered with only three shards, the data distribution management device 100 may send a shard transmission request to all of the plurality of off-chain storages 50, but in order to reduce the resources consumed for requesting/transmitting/receiving a shard, it is also possible to request shard transmission by selecting three off-chain storages among a plurality of off-chain storages 50.

In step S323, the data distribution management device 100 receives a predetermined number or more of shards transmitted by a plurality of off-chain storages 50 in response to a shard transmission request. The received predetermined number or more of shards may be stored in the storage space of the data distribution management device 100 to be used to recover the first information 30.

Figure 20:
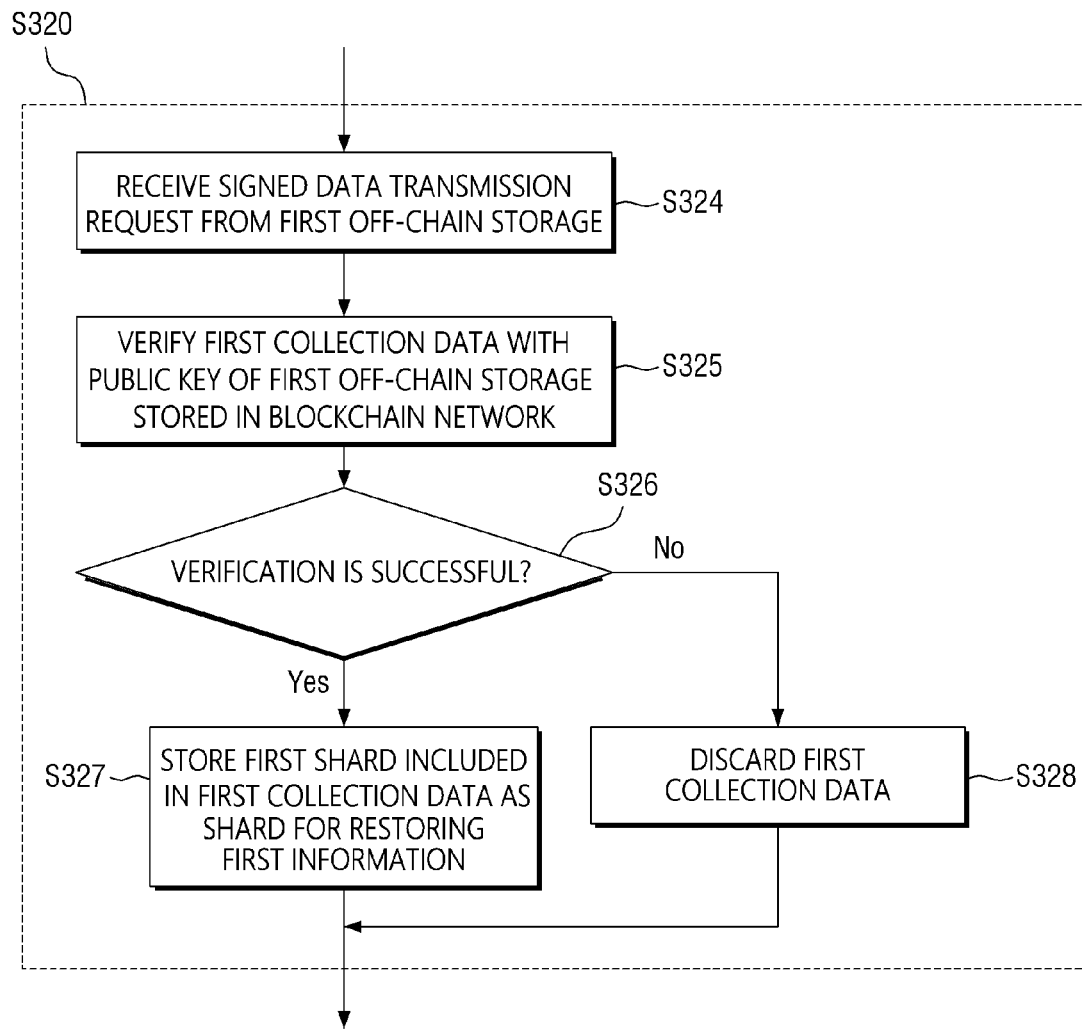
FIG. 20 is an exemplary embodiment, in which step S320 of receiving a predetermined number or more of shards from an off-chain storage in FIG. 15 is embodied, and is a flowchart illustrating embodiment of receiving a shard in an inbound method.
Figure 21:
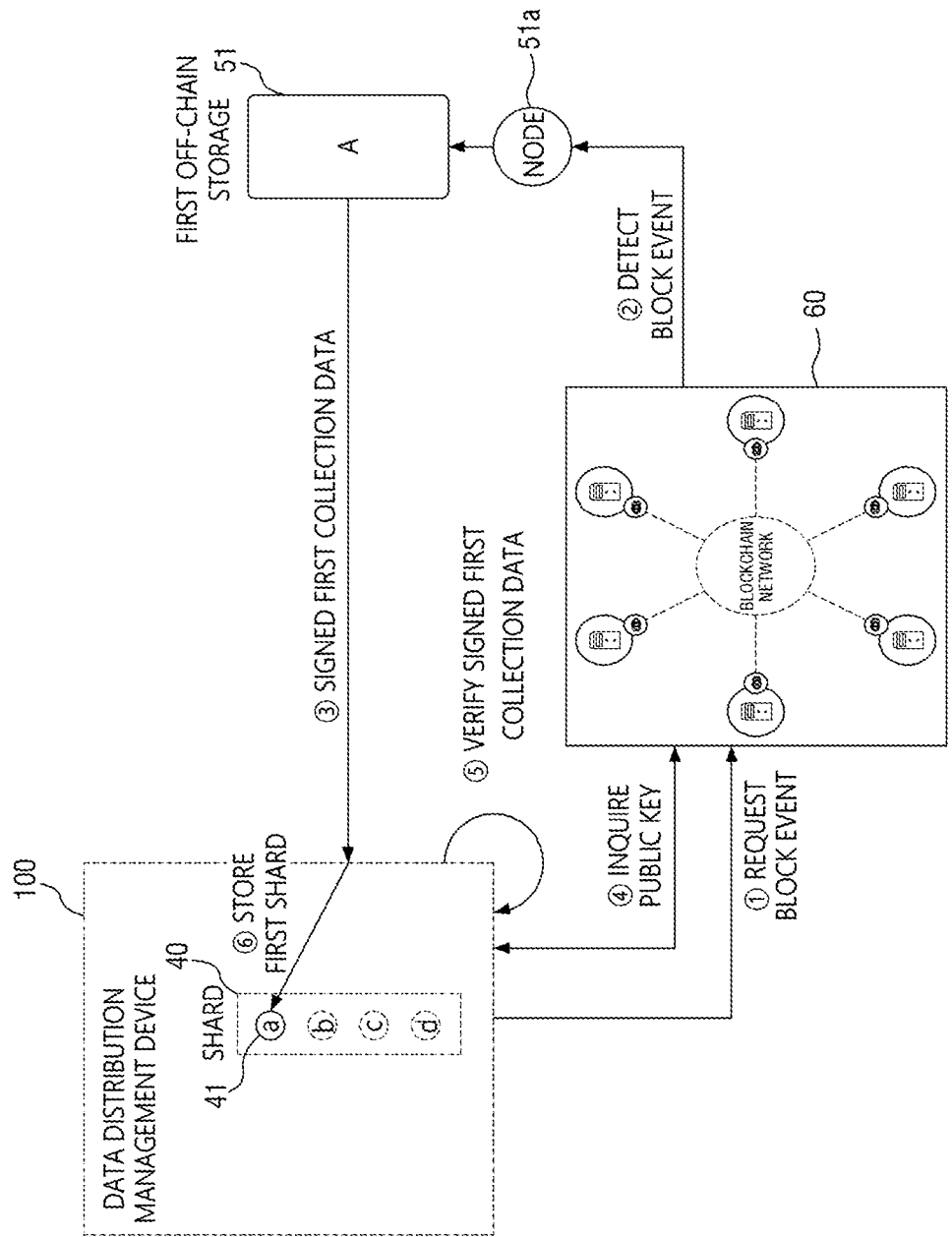
FIG. 21 is a conceptual diagram for further describing the embodiment described in FIG. 20.

FIG. 20 is an embodiment, in which step S320 of receiving a predetermined number or more of shards from an off-chain storage in FIG. 15 is embodied, and a flowchart illustrating an embodiment of receiving a shard in an inbound method. Here, 'inbound' means receiving a shard transmitted from the off-chain storage 50 without sending a separate shard transmission request.

Figure 14:
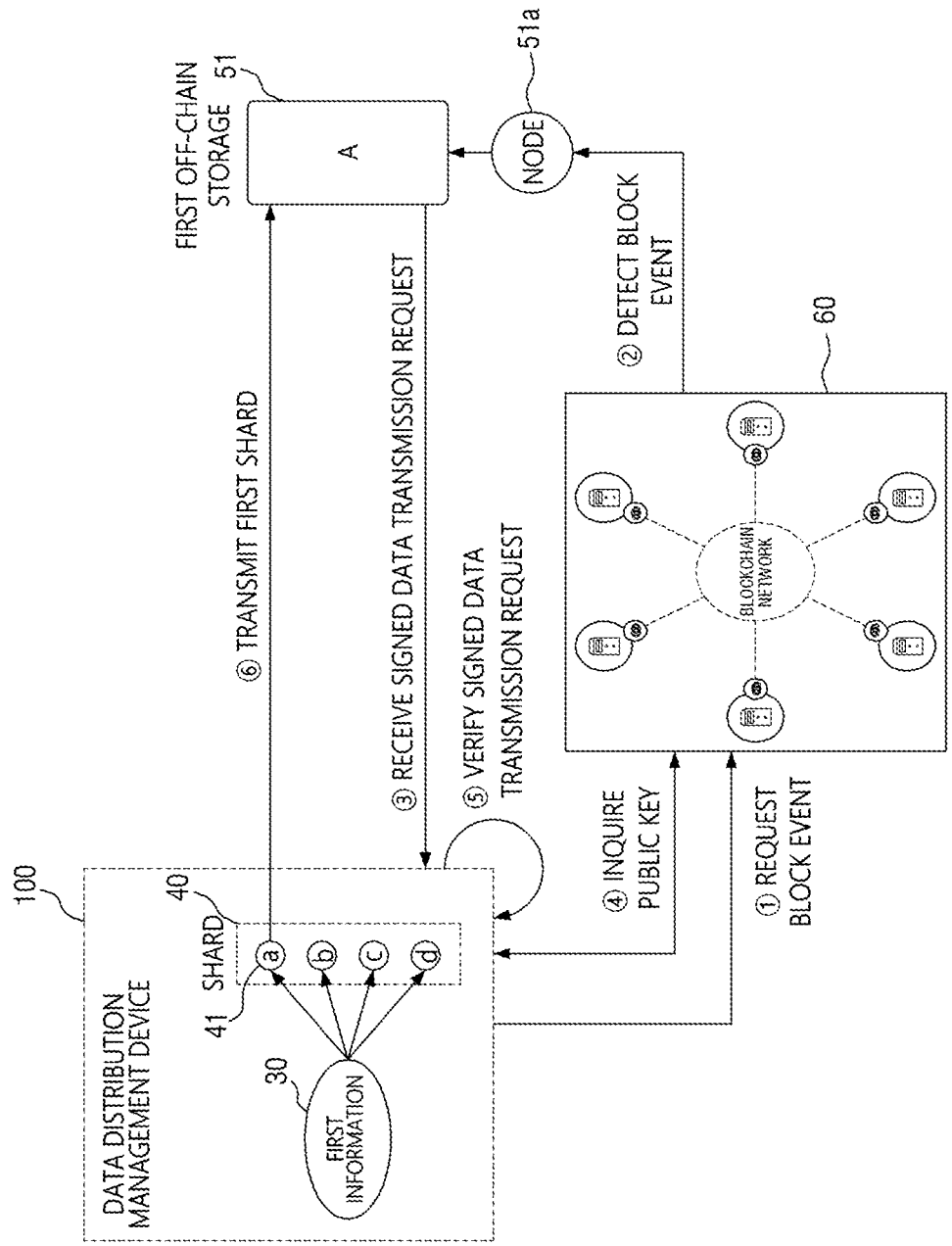
FIG. 14 is a conceptual diagram for further describing the embodiment described in FIG. 13.

In this embodiment, as in the embodiments of FIGS. 13 and 14 above, only a portion of receiving one shard 41 (*a*) from one off-chain storage 51 (A) is described by way of example for simplicity of description. However, since the individual processes of receiving shards from each of the plurality of off-chain storages 50 are the same, it is obvious to those skilled in the art that each of the plurality of off-chain storages 50 may transmit shards in parallel or independently, and the data distribution management device 100 may receive each of the transmitted shards simultaneously or sequentially by the same method as in this embodiment.

When the second block event occurs on the blockchain network 60 by the second block event request in step S310 of FIG. 15, the first off-chain storage 51 detects that the second block event has occurred through a node 51a connected to itself, or directly detects it by itself. And, the first off-chain storage 51 refers to the history (third information) recorded by the second block event and confirms that the first shard 41 stored by itself should be transmitted to the data distribution management device 100. In response, the first off-chain storage 51 signs the first collection data including the first shard 41 with its own private key and transmits it to the data distribution management device 100. At this time, the private key is a private key matched with the DID of the first off-chain storage 51, and a public key paired with the private key is recorded and published in the blockchain network 60.

As an embodiment, the first collection data may include the first shard 41 and meta data related to the first shard 41.

Now, referring to the flowchart of FIG. 20, in step S324, the data distribution management device 100 receives the signed first collection data transmitted from the first off-chain storage 51. Here, the signed first collection data means first collection data signed by the first off-chain storage 51 mentioned above with its own private key.

In step S325, after receiving the signed first collection data, the data distribution management device 100 verifies the signed first collection data to check whether it is from an authorized device (i.e., a device storing the shard to be collected).

Specifically, when receiving the signed first collection data, the data distribution management device 100 inquires the public key of the first off-chain storage 51 in the blockchain network 60. Then, the signed first collection data is verified by decrypting the signed first collection data with the inquired public key.

In step S326, the data distribution management device 100 determines whether the verification of the signed first collection data is successful. For example, the data distribution management device 100 determines that the verification is successful if the signed first collection data has been successfully decrypted with the public key that was previously inquired, and otherwise determines that the verification fails.

If the verification is successful, since it is confirmed that the signed first collection data is from an authorized device, the present embodiment proceeds to step S327, and the data distribution management device 100 extracts the first shard 41 from the first collected data, and stores the extracted first shard 41 in a separate storage space until all shards required to restore the first information 30 are collected.

On the other hand, if the verification fails, since the signed first collection data is not from an authorized device, the present embodiment proceeds to step S328 to discard the first collection data.

According to this embodiment, in the case of collecting shards in an inbound method, the identity of the off-chain storage that transmitted the shard can be verified through the blockchain network 60, so it can prevent the normal data restoration from being hampered due to fake data received from an unauthorized device.

Hereinafter, an exemplary computing device 500 that can implement an apparatus and a system, according to various embodiments of the present disclosure will be described with reference to FIG. 22.

Figure 22:
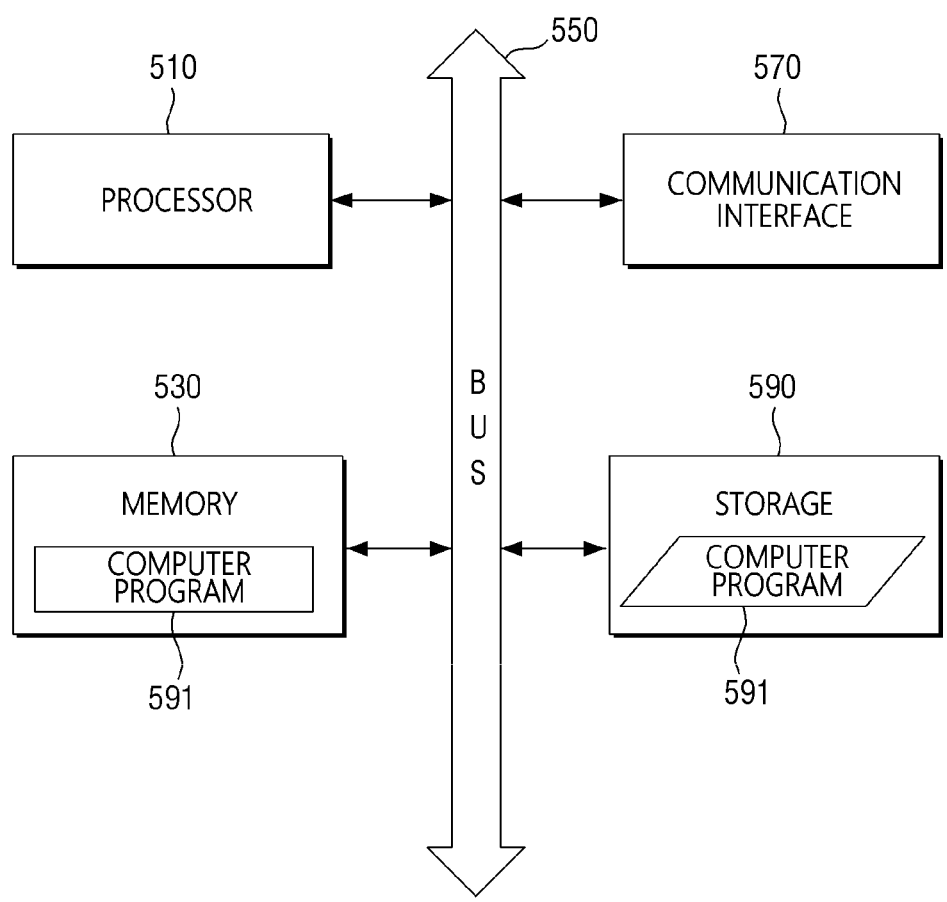
FIG. 22 is a block diagram illustrating an exemplary hardware configuration of a computing device 500, in which various embodiments of the disclosure are implemented.

FIG. 22 is an example hardware diagram illustrating a computing device 500.

As shown in FIG. 22, the computing device 500 may include one or more processors 510, a bus 550, a communication interface 570, a memory 530, which loads a computer program 591 executed by the processors 510, and a storage 590 for storing the computer program 591. However, FIG. 22 illustrates only the components related to the embodiment of the present disclosure. Therefore, it will be appreciated by those skilled in the art that the present disclosure may further include other general purpose components in addition to the components shown in FIG. 22.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to include a communication module well known in the art of the present disclosure.

The storage 590 can non-temporarily store one or more computer programs 591. The storage 590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. For example, the computer program 591 may include instructions for executing operations including generating a plurality of shards by fragmenting a first information, requesting a first block event for distributed storage of the plurality of shards in a plurality of off-chain storages to a blockchain network, and transmitting the plurality of shards to the plurality of off-chain storages, wherein a second information indicating a history of the plurality of shards distributed and stored in the plurality of off-chain storages is recorded in the blockchain network through the first block event, wherein when a predetermined number or more of shards among the plurality of shards are collected, the first information is restored from the collected predetermined number or more of shards. When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the disclosure. Therefore, the disclosed preferred embodiments of the invention are used in a generic and descriptive sense only and not for purposes of limitation. The scope of protection of the disclosure should be interpreted by the following claims, and all technical ideas within the scope equivalent thereto should be construed as being included in the scope of the technical idea defined by the present disclosure.

What is claimed is:

1. A blockchain-based data distribution management method performed by a computing device, the blockchain-based data distribution management method comprising:
generating a plurality of shards by fragmenting first information;
requesting a first block event for recording second information in a blockchain network to the blockchain network;
transmitting the plurality of shards to a plurality of off-chain storages for distributing and storing the plurality of shards in the plurality of off-chain storages;
requesting a second block event to collect the predetermined number or more of shards among the plurality of shards from the plurality of off-chain data storages from the blockchain network; and
receiving the predetermined number or more of shards from the plurality of off-chain storages,
wherein the second information indicating a history of the plurality of shards distributed and stored in the plurality of off-chain storages is recorded in the blockchain network through the first block event; and
when a predetermined number or more of shards among the plurality of shards are collected, the first information is restored from the collected predetermined number or more of shards,
wherein third information indicating a history of collecting the predetermined number or more of shards from the plurality of off-chain storages is recorded in the blockchain network through the second block event,
wherein the requesting of the second block event to the blockchain network comprises:
requesting the second block event together with attribute information including data ID information of the predetermined number or more of shards to the blockchain network,
wherein the attribute information is information signed with a private key of a user; and
a chain code of the blockchain network verifies the attribute information using a public key paired with the private key of the user, and executes the second block event if verification of the attribute information is successful.

2. The method of claim 1, wherein the first information is information encrypted using an encryption key; and
the encryption key is a key obtained by hashing unique information of a user.

3. The method of claim 2, wherein the unique information of the user is information generated based on biometric information including fingerprint information, iris information, facial recognition information, or gene information of the user.

4. The method of claim 1, wherein requesting the first block event to the blockchain network comprises:
obtaining DID information of the plurality of off-chain storages; and
requesting the first block event together with attribute information including the DID information from the blockchain network.

5. The method of claim 4, wherein the attribute information further includes data ID information of the plurality of shards and DID information of the user.

6. The method of claim 1, wherein transmitting the plurality of shards to the plurality of off-chain storages comprises:
detecting the first block event through the blockchain network; and
transmitting the plurality of shards to the plurality of off-chain storages in response to detecting the first block event.

7. The method of claim 1, wherein transmitting the plurality of shards to the plurality of off-chain storages comprises transmitting one or more dummy shards distinguished from the plurality of shards to one or more other off-chain storages.

8. The method of claim 1, wherein transmitting the plurality of shards to the plurality of off-chain storages comprises:
receiving a data transmission request signed with a private key of a first off-chain storage from the first off-chain storage among the plurality of off-chain storages;
verifying the data transmission request using a public key paired with the private key of the first off-chain storage; and
transmitting a first shard among the plurality of shards to the first off-chain storage if verification of the data transmission request is successful.

9. The method of claim 8, wherein the first off-chain storage detects the first block event through the blockchain network, and in response to detecting the first block event, signs the data transmission request with the private key of the first off-chain storage and transmits the data transmission request.

10. The method of claim 1, wherein receiving the predetermined number or more of shards from the plurality of off-chain storages comprises:
detecting the second block event through the blockchain network;
requesting a shard transmission toward the plurality of off-chain storages in response to detecting the second block event; and
receiving the predetermined number or more of shards transmitted by the plurality of off-chain storages in response to the shard transmission request.

11. The method of claim 1, wherein receiving the predetermined number or more of shards from the plurality of off-chain storages comprises:

receiving a first collection data signed with a private key of a first off-chain storage from the first off-chain storage among the plurality of off-chain storages, wherein the first collection data includes a first shard among the predetermined number or more of shards;

verifying the first collection data using a public key paired with the private key of the first off-chain storage; and storing the first shard included in the first collection data if verification of the first collection data is successful.

12. The method of claim 11, wherein the first off-chain storage detects the second block event through the blockchain network, and in response to detecting the second block event, signs the first collection data with the private key of the first off-chain storage and transmits the first collection data.

13. The method of claim 1 further comprises:

integrating the predetermined number or more of shards to restore the first information after receiving the predetermined number or more of shards from the plurality of off-chain storages.

14. A blockchain-based data distribution management apparatus comprising:

a processor;

a memory for loading a computer program executed by the processor; and a storage for storing the computer program comprises instructions for executing operations comprising:

generating a plurality of shards by fragmenting first information;

requesting a first block event for recording second information in a blockchain network to the blockchain network;

transmitting the plurality of shards to a plurality of off-chain storages for distributing and storing the plurality of shards in the plurality of off-chain storages;

requesting a second block event to collect the predetermined number or more of shards among the plurality of shards from the plurality of off-chain data storages from the blockchain network; and receiving the predetermined number or more of shards from the plurality of off-chain storages, wherein the second information indicating a history of the plurality of shards distributed and stored in the plurality of off-chain storages is recorded in the blockchain network through the first block event; and when a predetermined number or more of shards among the plurality of shards are collected, the first information is restored from the collected predetermined number or more of shards, wherein third information indicating a history of collecting the predetermined number or more of shards from the plurality of off-chain storages is recorded in the blockchain network through the second block event, wherein the requesting of the second block event to the blockchain network comprises:

requesting the second block event together with attribute information including data ID information of the predetermined number or more of shards to the blockchain network, wherein the attribute information is information signed with a private key of a user; and a chain code of the blockchain network verifies the attribute information using a public key paired with the private key of the user, and executes the second block event if verification of the attribute information is successful.

15. A computer program combined with a computing device for executing a blockchain-based data distribution management method, wherein the computer program is stored in a computer readable recording medium for executing steps comprising:

generating a plurality of shards by fragmenting first information;

requesting a first block event for recording second information in a blockchain network to the blockchain network;

transmitting the plurality of shards to a plurality of off-chain storages for distributing and storing the plurality of shards in the plurality of off-chain storages;

requesting a second block event to collect the predetermined number or more of shards among the plurality of shards from the plurality of off-chain data storages from the blockchain network; and receiving the predetermined number or more of shards from the plurality of off-chain storages, wherein the second information indicating a history of the plurality of shards distributed and stored in the plurality of off-chain storages is recorded in the blockchain network through the first block event; and when a predetermined number or more of shards among the plurality of shards are collected, the first information is restored from the collected predetermined number or more of shards, wherein third information indicating a history of collecting the predetermined number or more of shards from the plurality of off-chain storages is recorded in the blockchain network through the second block event, wherein the requesting of the second block event to the blockchain network comprises:

requesting the second block event together with attribute information including data ID information of the predetermined number or more of shards to the blockchain network, wherein the attribute information is information signed with a private key of a user; and a chain code of the blockchain network verifies the attribute information using a public key paired with the private key of the user, and executes the second block event if verification of the attribute information is successful.

* * * * *